US008392172B2

(12) United States Patent
Scott et al.

(10) Patent No.: US 8,392,172 B2
(45) Date of Patent: *Mar. 5, 2013

(54) HANDHELD ELECTRONIC DEVICE HAVING SELECTABLE LANGUAGE INDICATOR FOR LANGUAGE SELECTION AND METHOD THEREFOR

(75) Inventors: Sherryl Lee Lorraine Scott, Toronto (CA); Zaheen Somani, Richmond (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,713

(22) Filed: Sep. 14, 2012

(65) Prior Publication Data

US 2013/0006606 A1  Jan. 3, 2013

Related U.S. Application Data

(63) Continuation of application No. 13/278,375, filed on Oct. 21, 2011, now Pat. No. 8,290,767, which is a continuation of application No. 11/558,628, filed on Nov. 10, 2006, now Pat. No. 8,069,028.

(51) Int. Cl.
G06F 17/28 (2006.01)
(52) U.S. Cl. ......... 704/2; 704/3; 704/8; 704/9; 345/169; 379/88.06
(58) Field of Classification Search .................. 704/1–9; 345/169; 379/88.06
See application file for complete search history.

(56) References Cited

U.S. PATENT DOCUMENTS

| | | | |
|---|---|---|---|
| 5,734,597 A | 3/1998 | Molnar et al. | |
| 6,392,640 B1 | 5/2002 | Will | |
| 6,542,170 B1 | 4/2003 | Williams et al. | |
| 7,207,005 B2 | 4/2007 | Lakritz | |
| 7,224,989 B2 | 5/2007 | Kraft | |
| 2002/0059448 A1 | 5/2002 | Honeywood | |
| 2002/0196163 A1 | 12/2002 | Bradford et al. | |
| 2005/0021533 A1 | 1/2005 | Ayachitula et al. | |
| 2005/0102620 A1 | 5/2005 | Seto et al. | |
| 2005/0198023 A1 | 9/2005 | James et al. | |
| 2006/0058995 A1 | 3/2006 | Fux et al. | |
| 2007/0124675 A1 | 5/2007 | Ban et al. | |

FOREIGN PATENT DOCUMENTS

| | | |
|---|---|---|
| CA | 2 541 580 | 9/2007 |
| DE | 103 53 512 | 6/2005 |
| DE | 112005002100 | 7/2007 |
| EP | 0930760 A2 | 7/1999 |
| WO | 98/33111 | 7/1998 |

(Continued)

OTHER PUBLICATIONS

Bott et al., "Special Edition Using Microsoft 2000—Chapter 26: Word 2000 Multilanguage Features," May 1999, QUE Corporation.

(Continued)

*Primary Examiner* — Talivaldis Ivars Smits
*Assistant Examiner* — Shaun Roberts
(74) *Attorney, Agent, or Firm* — Finnegan, Henderson, Farabow, Garrett & Dunner, L.L.P.

(57) ABSTRACT

A method of enabling the selection of a language to be employed as a method input language by a disambiguation routine of a handheld electronic device having stored therein a plurality of method input languages and disambiguation routine number, includes detecting a selection of a language, detecting as an ambiguous input an actuation of one or more input members, outputting at least a plurality of the language objects that corresponds to the ambiguous input, outputting an indicator which one of the method input languages is currently employed by the disambiguation function, and enabling an alternate one of the input language methods to be selected in response to a selection of the indicator in lieu of one of the plurality of language objects.

20 Claims, 6 Drawing Sheets

FOREIGN PATENT DOCUMENTS

| | | |
|---|---|---|
| WO | 2006/062579 | 6/2006 |
| WO | 2006024147 | 9/2006 |
| WO | 2006/113995 | 11/2006 |

OTHER PUBLICATIONS

"Notes Requesting Submission of Opinion" from the Korean Intellectual Property Office, dated Oct. 19, 2010, pp. 1-3.

Office Action from the German Patent and Trademark Office, dated May 4, 2010, pp. 1-4.

Office Action from the German Patent and Trademark Office, dated Mar. 22, 2011, pp. 1-4.

Office Action, dated Jan. 25, 2012, in corresponding Canadian Application No. 2,655,638 (3 pages).

Office Action, dated Mar. 5, 2012, in corresponding Chinese Application No. 200780030098.3 (7 pages).

HANDHELD ELECTRONIC DEVICE HAVING SELECTABLE LANGUAGE INDICATOR FOR LANGUAGE SELECTION AND METHOD THEREFOR

This is a continuation of co-pending application Ser. No. 13/278,375, filed Oct. 21, 2011, which is a continuation of patent application Ser. No. 11/558,628, filed Nov. 10, 2006, issued as U.S. Pat. No. 8,069,028, both of which are incorporated herein by reference.

BACKGROUND

1. Field

The disclosed and claimed concept relates generally to electronic devices and, more particularly, to a method for indicating and selecting a language on a handheld electronic device.

2. Description of the Related Art

Numerous types of handheld electronic devices are known. Examples of such handheld devices include, for instance, personal data assistants (PDAs), handheld computers, two-way pagers, cellular telephones, and the like. Many handheld electronic devices also feature wireless communication capability, although many such handheld devices are stand-alone devices that are functional without communication with other devices.

Handheld electronic devices are used in a variety of language settings and users can often find themselves writing text in multiple languages. For example, a user might reply to one e-mail message in French and another in English. However, in order to utilize a handheld electronic device's advance features, such as disambiguation, the user might have to select the language that, for example, corresponds to the language of the original message to which he/she is replying. Switching among multiple languages can often confuse the user since the user might believe that the currently selected language on the handheld electronic device is one language, but in reality the operative language is another language. Therefore, incorrectly believing that the currently selected language is the desired language, the user might unwittingly begin to enter input which corresponds to the desired language, fully expecting the disambiguation function of the handheld electronic device to correctly disambiguate any ambiguous inputs that the user enters. However, since the currently selected language is the incorrect language, the handheld electronic device will disambiguate the ambiguous inputs based on the other language. Assuming that the user realizes that the currently selected language on the handheld electronic device is not the desired language prior to completing the data entry, the steps required to rectify the situation (e.g. select the correct language and correct any incorrect data) will consume time. It would be desirable to overcome this shortcoming in an efficient fashion that makes the device easier to use.

BRIEF DESCRIPTION OF THE DRAWINGS

A full understanding of the disclosed and claimed concept can be gained from the following Description when read in conjunction with the accompanying drawings in which:

DESCRIPTION

The accompanying figures and the description that follows set forth the disclosed and claimed concept in its preferred embodiments. It is, however, contemplated that persons generally familiar with handheld electronic devices will be able to apply the novel characteristics of the structures and methods illustrated and described herein in other contexts by modification of certain details. Accordingly, the figures and description are not to be taken as restrictive on the scope of the disclosed and claimed concept, but are to be understood as broad and general teachings.

When referring to the term "language object" and variations thereof, such designations shall refer broadly to any type of object that may be constructed, identified, or otherwise obtained from one or more linguistic elements, that can be used alone or in combination to generate text, and that would include, for example and without limitation, words, shortcuts, symbols, ideograms, and the like.

When referring to the term "linguistic element" and variations thereof, such designations shall refer broadly to any element that itself can be a language object or from which a language object can be constructed, identified, or otherwise obtained, and thus would include, but not be limited to, characters, letters, strokes, symbols, ideograms, phonemes, morphemes, digits (numbers), and the like.

When referring to the term "letter" and variations thereof, such designations are meant to cover all letters of the Latin alphabet regardless of whether the letter is uppercase (Majuscule form) or lowercase (Minuscule form).

When referring to the term "reduced" and variations thereof in the context of a keyboard, a keypad, or other arrangement of input members, such designations shall refer broadly to an arrangement in which at least one of the input members has assigned thereto a plurality of linguistic elements such as, for example, characters in the set of Latin letters.

When referring to the term "window" and variations thereof, such designations by way of example, and not limitation, shall refer to a visualized layer, tile, overlay or other similar variant thereof that is output on a display or screen.

When referring to the phrase "default language" and variations thereof, such designations shall refer to the primary language of the handheld electronic device.

For purposes of the description hereinafter, the terms "upper", "lower", "right", "left", "vertical", "horizontal", "top", "bottom", and derivatives thereof shall relate to the disclosed and claimed concept as it is oriented in the figures.

Figure 1:
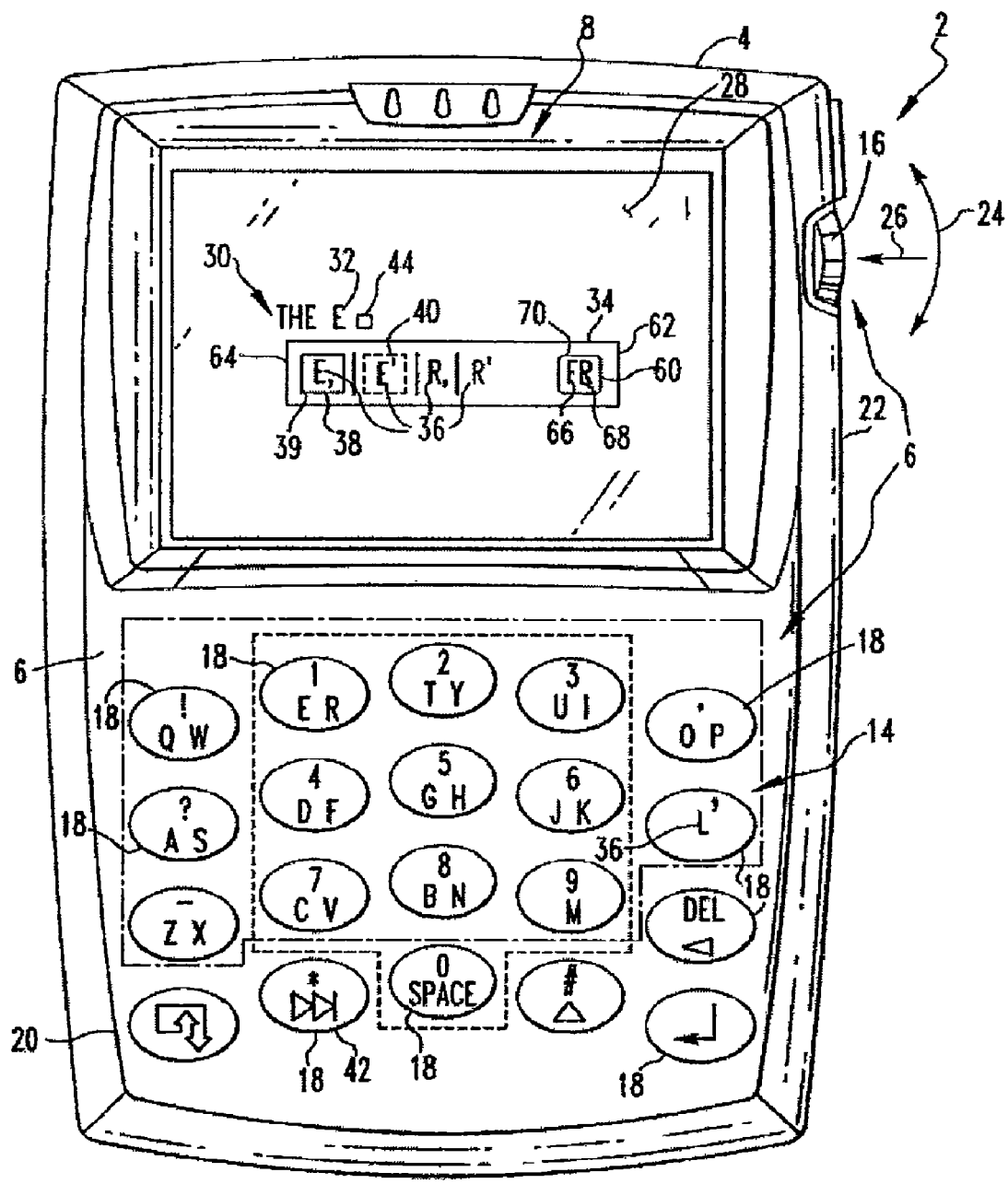
FIG. 1 is a top plan view of an improved handheld electronic device in accordance with the disclosed and claimed concept.
Figure 2:
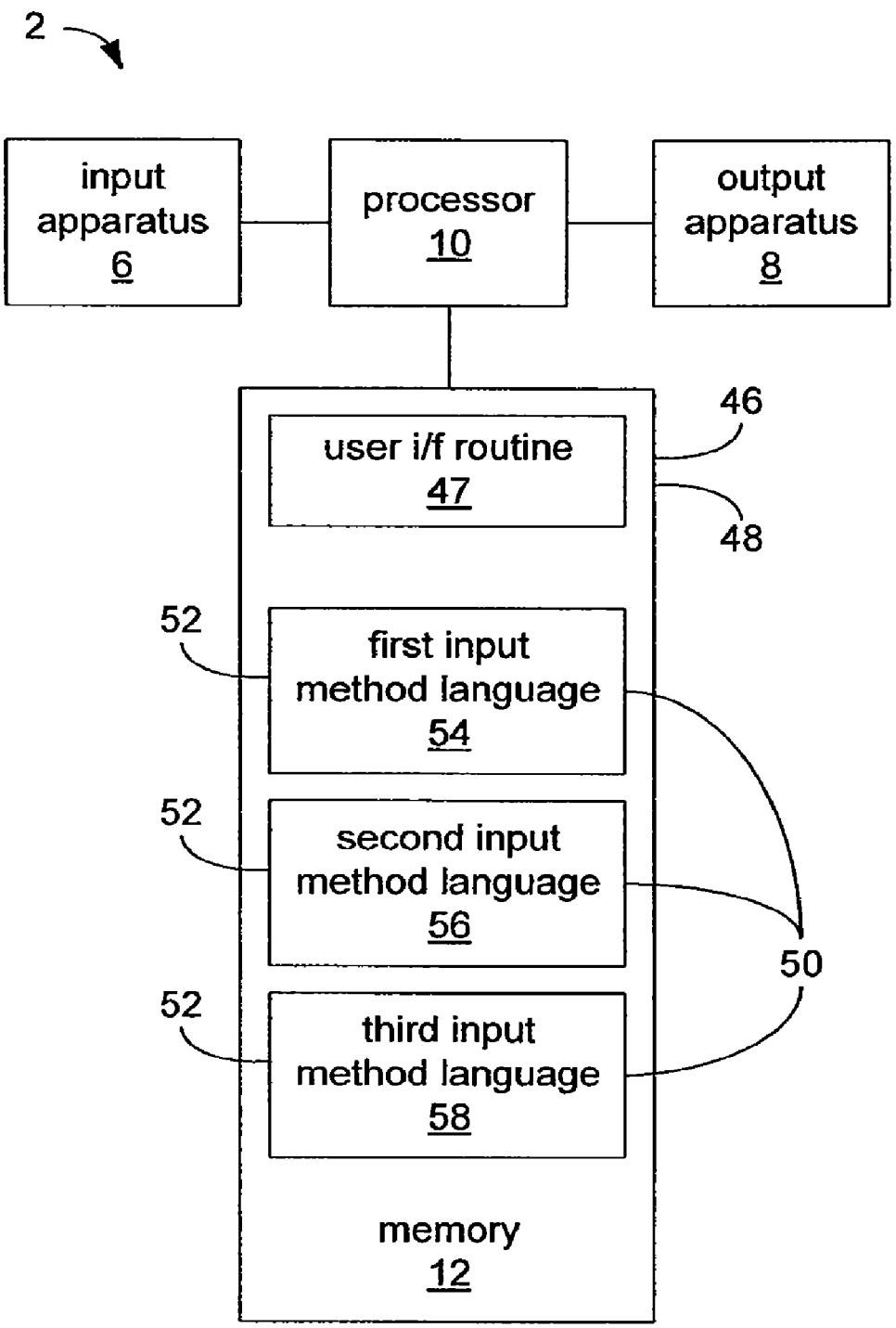
FIG. 2 is a schematic depiction of the improved handheld electronic device of FIG. 1.

An improved handheld electronic device 2 is indicated generally in FIG. 1 and is depicted schematically in FIG. 2. The exemplary handheld electronic device 2 includes a housing 4 upon which is disposed a processor unit that includes an input apparatus 6, an output apparatus 8, a processor 10, and a memory 12. The processor 10 may be, for instance, and without limitation, a microprocessor (μP) and is responsive to inputs from the input apparatus 6 and provides output signals to the output apparatus 8. The processor 10 also interfaces with the memory 12. The processor 10 and the memory 12 together form a processor apparatus.

As can be understood from FIG. 1, the input apparatus 6 includes a keypad 14 and a trackwheel 16. As will be described in greater detail below, the keypad 14 is in the exemplary form of a reduced QWERTY keyboard including a plurality of keys 18 that serve as input members. It is noted, however, that the keypad 14 may be of other configurations, such as an AZERTY keyboard, a QWERTZ keyboard, or other keyboard arrangement, whether presently known or unknown, and either reduced or not reduced.

The keys 18 are located on a front face 20 of the housing 4, and the trackwheel 16 is located at a side 22 of the housing 4. In addition to the keys 18, the trackwheel 16 can serve as another input member since the trackwheel 16 is capable of being rotated, as indicated by arrow 24, and depressed generally toward the housing 4, as indicated by arrow 26. Rotation of the trackwheel 16 provides certain inputs to the processor 10, while depression of the trackwheel 16 provides other input to the processor 10.

The system architecture of the handheld electronic device 2 advantageously is organized to be operable independent of the specific layout of the keypad 14. Accordingly, the system architecture of the handheld electronic device 2 can be employed in conjunction with virtually any keypad layout without requiring any meaningful change in the system architecture. It is further noted that certain features set forth herein are usable on either or both of a reduced keyboard and a non-reduced keyboard.

The memory 12 is depicted schematically in FIG. 2. The memory 12 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. As can be seen from FIG. 2, the memory 12 is in electronic communication with the processor 10.

The memory 12 additionally can include one or more routines depicted generally with the numeral 46 for the processing of data and carrying out other functions, including a user interface routine 47. When executed by the processor 10, the user interface routine 47, possibly in combination with another of the routines 46, causes the processor 10 to receive inputs from the keypad 14, the trackwheel 16 and/or other input devices, and causes the processor 10 to present various forms of output on the display 28 and/or other output devices, as will shortly be explained. In other words, when sequences of instructions of the user interface routine 47 are executed by the processor 10, a user of the handheld electronic device 2 is provided with a way to interact with the handheld electronic device 2. The routines 46 can be in any of a variety of forms such as, without limitation, software, firmware, and the like. Additionally, the memory 12 can also store and make available a variety of data sources 48 such as, without limitation, one or more input method languages (i.e. "language" or "languages") 50 having language objects associated therewith.

The input method languages 50 may also have corresponding linguistic sources 52 such as a generic word list or a language rule set. FIG. 2 depicts the memory 12 as containing three input method languages 50. The first input method language 54 can be English, the second input method language 56 can be French, and the third input method language 58 can be Spanish. It is noted, however, that despite FIG. 2 depicting only three input method languages 54, 56, 58 being stored within memory 12, the total number of input method languages 50 that can be stored in the memory 12 is limited only by the memory's 12 capacity. Once a user selects an input method language 50, the selected input method language becomes the operative input method language and the preferred data source for the handheld electronic device 2. The preferred data source is utilized by the handheld electronic device 2 to disambiguate any ambiguous inputs that are entered into the handheld electronic device 2. It is noted, however, that an input method language can be a default operative input method language, thus being operative without being expressly selected by a user.

Figure 4:
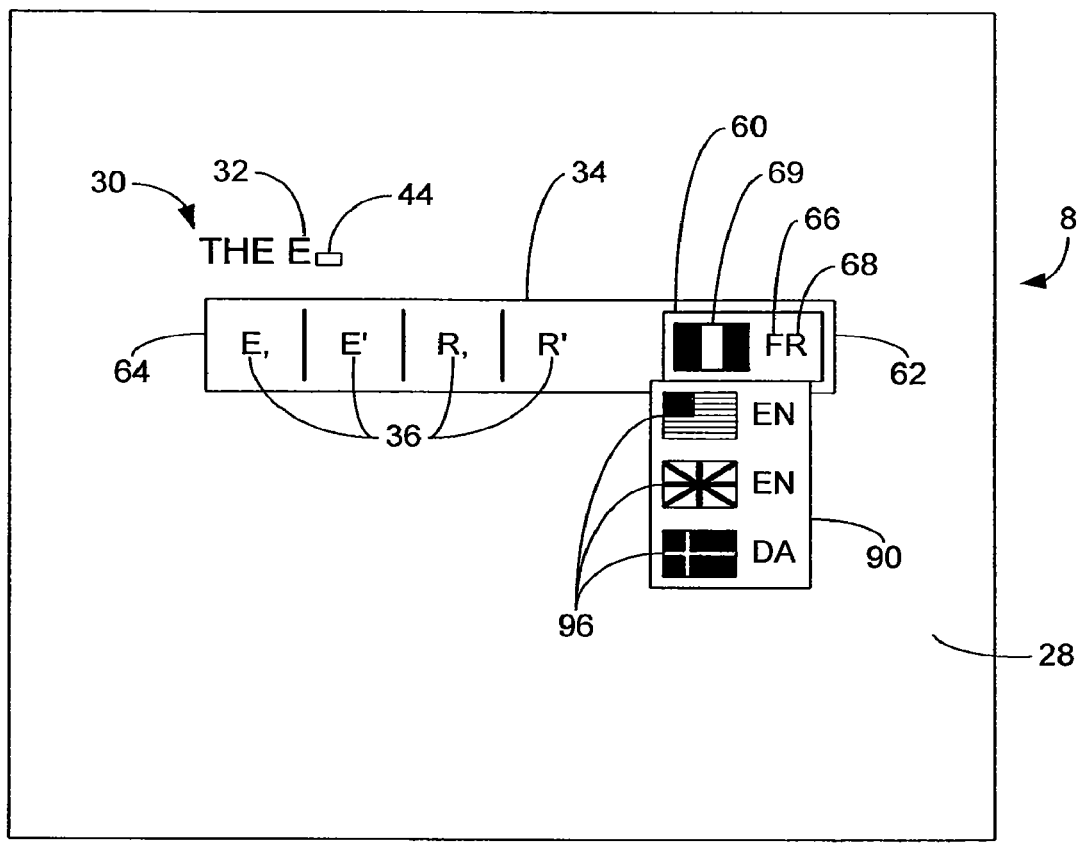
FIG. 4 is a flowchart depicting an embodiment of an improved method in accordance with the disclosed and claimed concept.

Returning to FIG. 1, the output apparatus 8 includes a display 28 upon which can be provided an output 30. An exemplary output 30 on the display 28 is depicted in FIG. 1. The output 30 includes a text component 32 and a window (variant component) 34. As depicted in FIG. 1, the window 34 extends substantially horizontally across the display 28. This, however, is not meant to be limiting since the window 34 can also extend across the display 28 substantially vertically, as depicted in FIG. 4, or in other fashions. Preferably, the window 34 is located generally in the vicinity of the text component 32. The window 34 includes a number of outputs 36 from which the user can select, and a selection box 38 that provides an indication of what is selectable at any given time, as will be explained. As depicted in FIG. 1, the selection box 38 is at a default position 39, thereby indicating that a default one of the outputs 36 is currently selectable. As described in U.S. patent application Ser. No. 10/931,281 entitled "Handheld Electronic device with Text Disambiguation," the outputs 36 are language objects selected from language objects stored in the memory 12 and proposed by the text disambiguation function as being the most likely disambiguated interpretation of the ambiguous input provided by the user.

Figure 3:
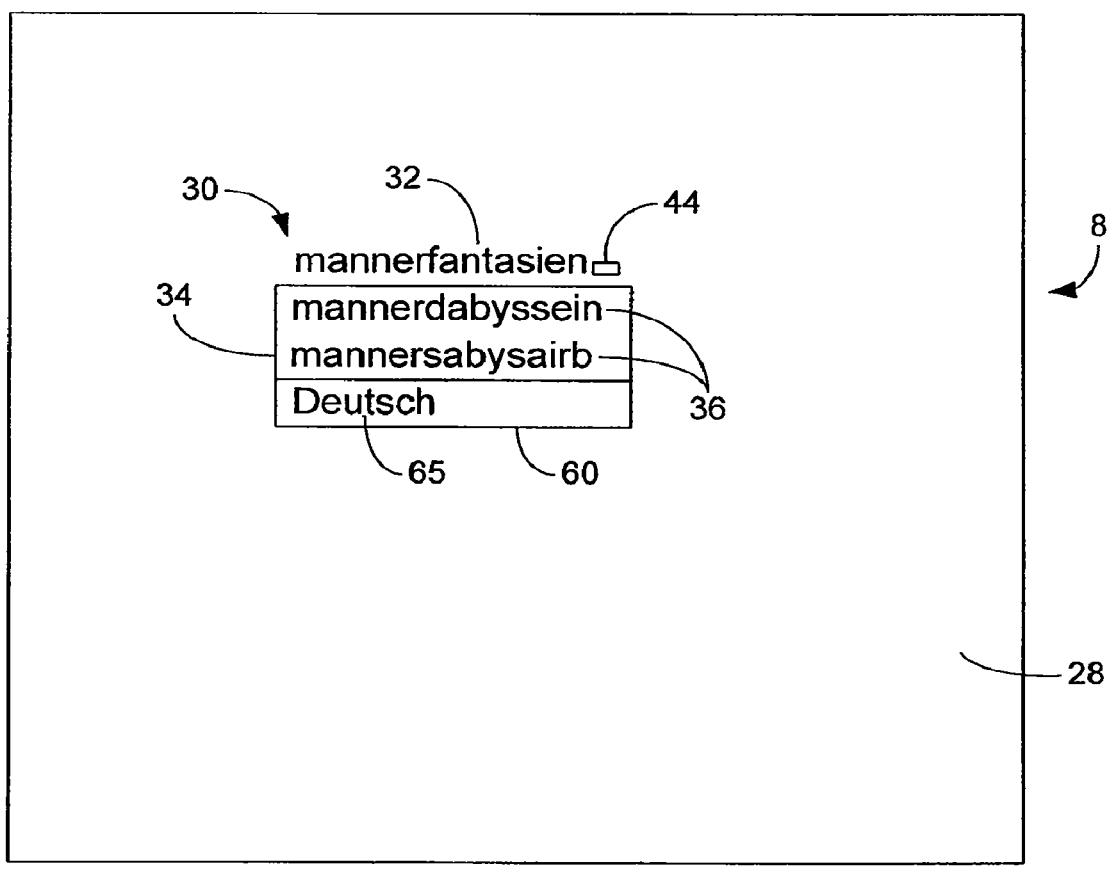
FIG. 3 is a depiction of an output that can be displayed on an output apparatus of the improved handheld electronic device.

As can also be seen in FIG. 1, FIG. 3 and FIG. 4, a visual indicator 60, indicating a preferred data source (e.g., grammatical rules and/or vocabulary of a language), is also provided in the window 34. In order to facilitate the entry of text into the handheld electronic device 2 and to prevent user confusion regarding the currently selected language on the handheld electronic device 2, the visual indicator 60 enables a user to quickly identify what language is currently operative. In this particular embodiment, the visual indicator 60 is positioned substantially adjacent to a right end 62 of the window 34. It is noted, however, that the visual indicator 60 can also be positioned substantially adjacent to a left end 64 of the window 34 or in other positions, such as within the caret 44 or on another part of the display 28.

The visual indicator 60 provides a visual identifier of a choice of a language to a user of the handheld electronic device 2. The visual indicator 60 may include one or more of first and second linguistic elements 66 and 68 that form an abbreviation specifying a particular language as depicted in FIG. 1, an unabbreviated name 65 of a language as depicted in FIG. 3, or a graphical symbol 69 representative of a flag or other symbol associated with a particular language as depicted in FIG. 4. The visual indicator 60 may be surrounded by a box 70 and/or may be offset from the outputs 36 to prevent a user from mistakenly identifying the visual indicator 60 as an output 36. Furthermore, the box 70 may be shaped or colored differently from the selection box 38. In the exemplary output depicted in FIG. 1, the visual indicator 60 includes the letters "F" and "R" which is an abbreviation of "French," along with a linguistic symbol 69 providing a representation of the flag of France. Accordingly, as depicted, the visual indicator 60 alerts the user that French is the currently selected language on the handheld electronic device 2.

The selection box 38 is capable of being moved (i.e. shifted) from the default position 39 to a number of different positions 40 by depressing or actuating a <NEXT> key 42 or by rotating the trackwheel 16. The display 28 also includes a caret (cursor) 44 that depicts generally where the next output will be displayed. As the selection box 38 is moved through different ones of the different positions 40, different ones of the outputs 36 become selectable by depressing the trackwheel 16 towards the housing 4, by pressing one of the keys 18 and/or by actuating some other form of input device (not shown) disposed on the housing 4. Upon reaching the last of the outputs 36, the selection box 38 can be moved beyond the last of the outputs 36 and to the visual indicator 60 such that the visual indicator 60 becomes selectable, and in a manner substantially similar to that by which each of the outputs 36 may become selectable. In this way, the visual indicator 60 may be selected in lieu of one of the outputs 36. Furthermore, upon the visual indicator 60 becoming selectable, still further movement of the selection box 38 beyond the last of the outputs 36 and beyond the visual indicator 60 results in a "wrap-around" of the selection box 38 back to the default position 39, in some embodiments. In alternate embodiments, the selection box 38 cannot be moved beyond the visual indicator 60.

Figure 5:
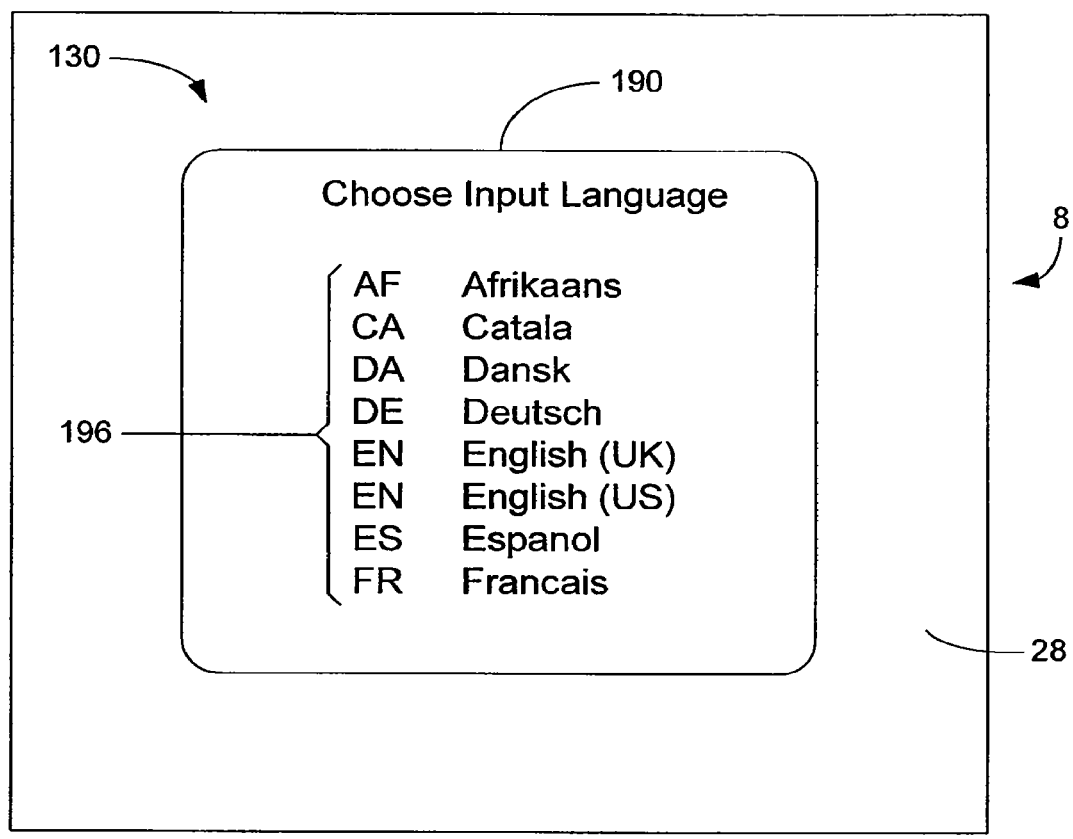
FIG. 5 is a flowchart depicting another embodiment of an improved method in accordance with the disclosed and claimed concept.

Upon the visual indicator 60 both becoming selectable, a user of the handheld electronic device 2 may select the visual indicator 60 by actuating the <NEXT> key 42, depressing the trackwheel 16 or actuating some other form of input device disposed on the housing 4. Selecting the visual indicator 60 allows the user to change the currently selected language. In some embodiments, upon selection of the visual indicator 60, the <NEXT> key 42, the trackwheel 16 and/or some other form of input device disposed on the housing 4 may be used to change in place the currently selected language by changing whichever of the linguistic elements 66 and 68, the unabbreviated name 65 or the graphical symbol 69 is currently displayed as part of the visual indicator 60. In other embodiments, upon selection of the visual indicator 60, a popup window 90 is presented that lists at least a subset of the choices of language 96 that may be selected, as depicted in FIG. 4. The popup window 90 may present each choice of language 96 as one or both of a pair of linguistic characters (not unlike the linguistic characters 66 and 68 within the visual indicator 60) or a graphical symbol (not unlike the graphical symbol 69 within the visual indicator 60). Alternatively or additionally, the popup window 90 may present each choice of language 96 as an unabbreviated name (not unlike the unabbreviated name 65 within the visual indicator 60). In still other embodiments, upon selection of the visual indicator 60, a language selection output 130 is presented on the display 28 in which a language selection menu 190 is displayed, as depicted in FIG. 5, in place of the window 34. As in the case of the popup window 90, the language selection menu 190 may use one or more of a pair of linguistic characters, an unabbreviated name and/or a graphical symbol to present each choice of language 196.

In some embodiments, as the selection box 38 is moved beyond the last of the outputs 36 and to the visual indicator 60, some form of tactile and/or audible feedback may be provided to a user of the handheld electronic device 2 that coincides with the selection box 38 being moved between one of the outputs 36 and the visual indicator 60. Such tactile and/or audible feedback would alert the user to the fact that he or she has progressed beyond the selection of available outputs 36 without the need to view the display 28 at that moment. In one possible embodiment where either the trackwheel 16 or a trackball (not shown) is employed in moving the selection box 38, a tactile feedback akin to a "bump" and/or a momentary resistance to movement may be provided that the user would feel through which ever ones of his or her fingers are employed in operating the trackwheel 16 or the trackball. Various trackwheels and trackballs equipped with a mechanism for causing a translation motion of the wheel or ball in a direction against the user's fingertips are commercially available as those skilled in the art will readily recognize. Such a trackwheel or trackball could be controlled in a manner that provides the user with a sensation that the wheel or ball is being "rolled" over a bump and/or that the wheel or ball is momentarily "stuck" at the moment that the selection box 38 is moved between one of the outputs 36 and the visual indicator 60.

It should be noted that although much of the preceding discussing has specified that the selection box 38 serves as the indication of which item in the window 34 is selectable, those skilled in the art will readily recognize that other visual indicators of which item in the window 34 is selectable may be employed. By way of example, various techniques of highlighting a selectable item may be employed, including, but not limited to, altering one or more colors of the selectable item, itself, such that the selectable item is made to stand out in comparison to one or more non-selectable items, or altering one or more colors of the background immediately adjacent to a selectable item such that the selectable item is surrounded with a distinguishing color.

Figure 6:
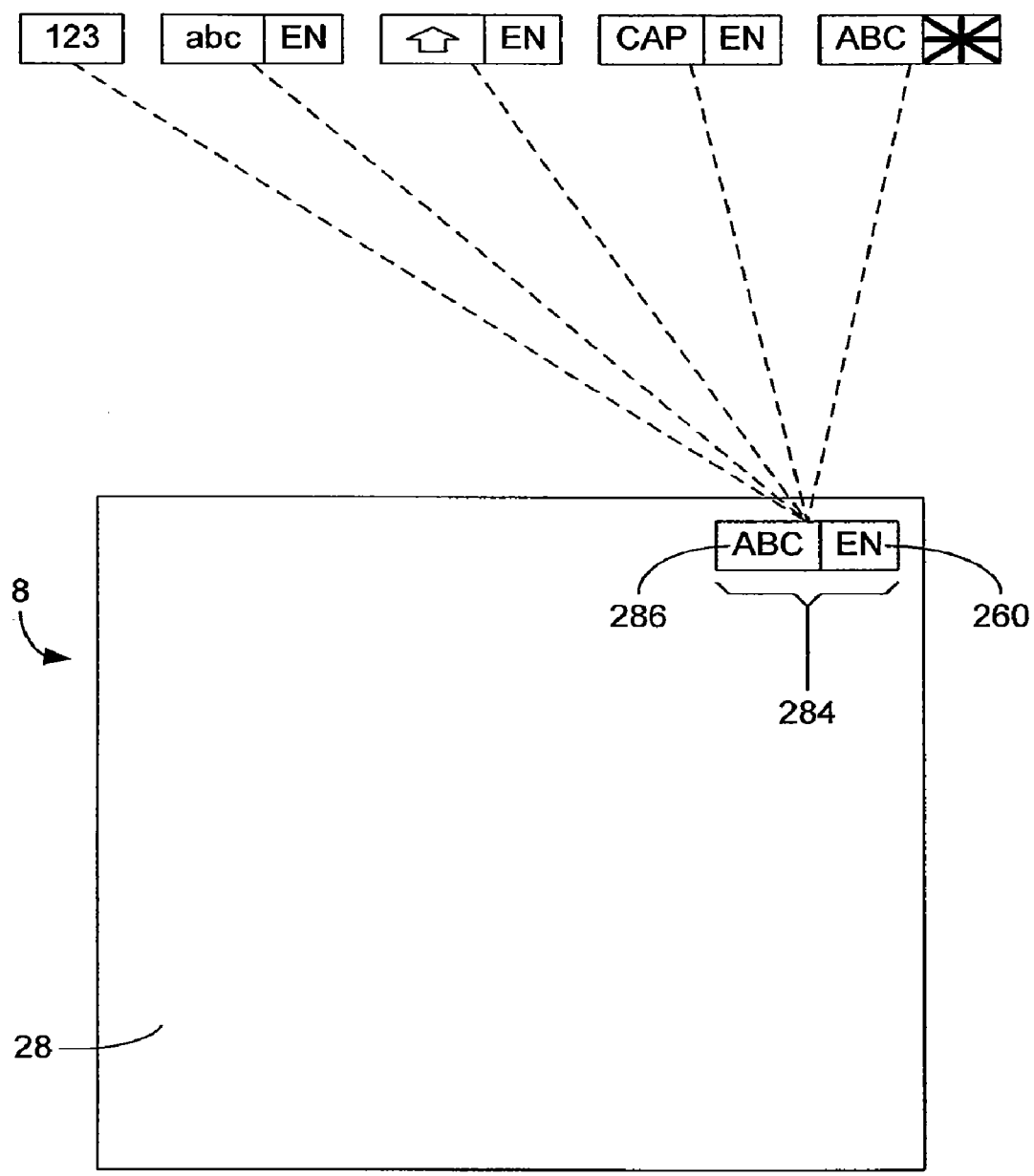
FIG. 6 depicts an input mode indicator on the display.

In some embodiments, as an alternative to presenting an operative language in a visual indicator as part of a window of selectable outputs as part of a disambiguation process, a visual indicator 260 may be presented as part of an input mode indicator 284 presented on a portion of the display 28. As depicted in FIG. 6, the input mode indicator 284 is positioned towards a corner of the display 28 so as to minimize its obstruction of the remainder of the space available on the display 28 for whatever use may be desired by a user of the handheld electronic device 2. The input mode indicator 284 includes a visual indicator 286 that presents information regarding other aspects of the current input mode, such whether a reduced-sized keyboard (e.g., the keypad 14) is currently in a numeric entry mode (as indicated with "123"), a lower-case letter entry mode (as indicated with "abc") or an upper-case letter entry mode (as variously indicated with an upward arrow, or either of "ABC" or "CAP"). As was the case with the earlier-discussed visual indicator 60, the visual indicator 260 may present the current choice of language with an abbreviation (e.g., "EN" as depicted), a graphical symbol (e.g., a flag as depicted), or an unabbreviated name of a language (not shown). In other words, the input mode indicator 284 presents one of a selection of possible input modes that combine a choice of numeric or text entry, a choice of capitalization, and a choice of language in each input mode. FIG. 6 depicts some of the available input modes that may be selected.

The remainder of the space available on the display 28 may be employed by one or more of the routines 46, including the user interface routine 47, to enable input of text or numbers by the user. Not unlike the earlier-described visual indicator 60, the input mode indicator 284 is selectable, though not as part of a list of selectable outputs generated by a disambiguation routine. In some embodiments, a trackball or input device (not shown) that is disposed on the housing 4 may be used to make the input mode indicator 284 selectable by moving a focus of the user interface routine 47 away from an application occupying the remainder of the space available on the display 28 and towards the input mode indicator 284. Upon the input mode indicator 284 being made selectable, and upon the input mode indicator 284 being selected, a different input mode may be selected. In some embodiments, the selection of the input mode indicator 284 results in an input mode selection menu not unlike the earlier-described language selection menu 190 that occupies at least a portion of the remainder of the space available on the display 28. In other embodiments, the selection of the input mode indicator 284 results in the presentation of a smaller popup menu not unlike the earlier-described popup window 90. In still other embodiments, the selection of the input mode indicator 284 allows the user to change in place the input mode indicator 284 (and with it, the associated input mode), perhaps by operating the trackwheel 16 or other input device, such as a trackball.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of enabling input into a handheld electronic device having a processor, the handheld electronic device of a type having available therein a plurality of input method languages and a text disambiguation function structured to employ an operative one of the plurality of the input method languages, the method comprising:
    detecting as an ambiguous input a selection of one or more characters;
    outputting a plurality of language objects based, at least in part, on the ambiguous input and the operative input method language;
    outputting an indicator representative of the operative input method language being used by the text disambiguation function;
    outputting a selection box at a first location that provides an indication that one of the plurality of language objects is selectable;
    detecting a first input associated with the indicator and, responsive thereto, outputting the selection box at a second location that provides an indication that the indicator is selectable;
    detecting a second input associated with the indicator and, responsive thereto, outputting one or more alternate indicators specifying one or more alternate operative input method languages.

2. The method of claim 1, further comprising outputting the plurality of language objects and the indicator disposed in a window on a display of an output apparatus.

3. The method of claim 2, further comprising outputting the plurality of language objects towards a first end of the window and outputting the indicator towards a second end of the window opposite the first end.

4. The method of claim 1, further comprising outputting as the indicator a plurality of linguistic elements.

5. The method of claim 4, further comprising outputting as the plurality of linguistic elements an abbreviation of a name of a language.

6. The method of claim 1, further comprising outputting as at least a portion of the indicator a graphical symbol associated with a language.

7. The method of claim 6, further comprising outputting as the graphical symbol a representation of a flag.

8. The method of claim 1, further comprising enabling an input apparatus to select from among the indicator and the plurality of language objects.

9. The method of claim 8, further comprising enabling the indicator to be selected by scrolling through the plurality of language objects to reach the indicator.

10. The method of claim 9, further comprising providing a tactile feedback through the input apparatus in response to scrolling through the plurality of language objects and reaching the indicator.

11. A handheld electronic device, comprising:
    a display;
    a processor apparatus comprising a processor and a memory in electronic communication with the processor, the memory having stored therein a plurality of input method languages and a text disambiguation function structured to employ one of the plurality of the input method languages, the processor apparatus being structured to:
    detect as an ambiguous input a selection of one or more characters;
    output a plurality of language objects based, at least in part, on the ambiguous input and the operative input method language;
    output an indicator representative of the operative input method language being used by the text disambiguation function;
    output a selection box at a first location that provides an indication that one of the plurality of language objects is selectable;
    detect a first input associated with the indicator and, responsive thereto, output the selection box at a second location that provides an indication that the indicator is selectable;
    detect a second input associated with the indicator and, responsive thereto, output one or more alternate indicators specifying one or more alternate operative input method languages.

12. The handheld electronic device of claim 11, wherein the output of the plurality of language objects and the indicator is a visual output.

13. The handheld electronic device of claim 12, wherein the output of the plurality of language objects and the indicator is disposed in a window on the display.

14. The handheld electronic device of claim 13, wherein the output of the plurality of language objects is towards a first end of the window and the output of the indicator is towards a second end of the window opposite the first end.

15. The handheld electronic device of claim 11, wherein the indicator comprises a plurality of linguistic elements.

16. The handheld electronic device of claim 15, wherein the plurality of linguistic elements form an abbreviation of a name of a language.

17. The handheld electronic device of claim 11, wherein the indicator comprises a graphical symbol associated with a language.

18. The handheld electronic device of claim 17, wherein the graphical symbol is a representation of a flag.

19. The handheld electronic device of claim 11, wherein the processor is further structured to enable the selection of the indicator by enabling scrolling through the plurality of language objects to reach the indicator.

20. The handheld electronic device of claim 11, wherein an input apparatus is structured to cooperate with the processor to enable scrolling through the plurality of language objects to reach the indicator, and wherein the input apparatus is structured to provide a tactile feedback in response to scrolling through the plurality of language objects and reaching the indicator.

* * * * *